US012094625B2

(12) United States Patent
Kim et al.

(10) Patent No.: US 12,094,625 B2
(45) Date of Patent: Sep. 17, 2024

(54) COOLING APPARATUS FOR SUPERCONDUCTOR COOLING CONTAINER

(71) Applicant: LS ELECTRIC CO., LTD., Anyang-si (KR)

(72) Inventors: Min-Jee Kim, Anyang-si (KR); Gyeong-Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 301 days.

(21) Appl. No.: 17/763,519

(22) PCT Filed: Sep. 23, 2020

(86) PCT No.: PCT/KR2020/012870
§ 371 (c)(1),
(2) Date: Mar. 24, 2022

(87) PCT Pub. No.: WO2021/060831
PCT Pub. Date: Apr. 1, 2021

(65) Prior Publication Data

US 2022/0336123 A1 Oct. 20, 2022

(30) Foreign Application Priority Data

Sep. 24, 2019 (KR) ........................ 10-2019-0117295
Jul. 17, 2020 (KR) ........................ 10-2020-0088974

(51) Int. Cl.
*H01B 12/16* (2006.01)
*F25D 19/00* (2006.01)

(52) U.S. Cl.
CPC ........... *H01B 12/16* (2013.01); *F25D 19/006* (2013.01)

(58) Field of Classification Search
CPC ............ F25D 19/00; H01B 12/16; H01F 6/04
See application file for complete search history.

(56) References Cited

U.S. PATENT DOCUMENTS 5,113,102 A * 5/1992 Gilmore ................ H02K 37/14 118/730
6,854,276 B1 2/2005 Yuan et al.
(Continued)

FOREIGN PATENT DOCUMENTS

CN 2788100 Y 6/2006
CN 1806153 A 7/2006
(Continued)

OTHER PUBLICATIONS

JP 2012 049413 translation (published 2012).*
(Continued)

*Primary Examiner* — Henry T Crenshaw
(74) *Attorney, Agent, or Firm* — K&L Gates LLP

(57) ABSTRACT

Disclosed is an disclosure pertaining to a cooling apparatus for a superconductor cooling container. The disclosed cooling apparatus for a superconductor cooling container comprises: an inner container which is disposed in an outer container and in which a superconductor is immersed in a liquid refrigerant; a refrigerator disposed outside the outer container to generate cold air; and a cryogenic maintenance device which is connected to the refrigerator and maintains the inside of the inner container in a cryogenic state.

16 Claims, 14 Drawing Sheets

(56) References Cited

U.S. PATENT DOCUMENTS

| | | | | |
|---|---|---|---|---|
| 2005/0028537 | A1 | 2/2005 | Yuan et al. | |
| 2011/0015078 | A1 | 1/2011 | Gao et al. | |
| 2014/0223921 | A1* | 8/2014 | Tschuor | F01D 9/023 415/213.1 |
| 2020/0038777 | A1* | 2/2020 | Galyuk | B01D 11/0288 |

FOREIGN PATENT DOCUMENTS

| | | | |
|---|---|---|---|
| CN | 102597794 | A | 7/2012 |
| JP | H11195523 | A | 7/1999 |
| JP | 2012049413 | A | 3/2012 |
| JP | 2012-049413 | * | 10/2012 |
| JP | 2016211748 | A | 12/2016 |
| KR | 101046323 | B1 | 6/2011 |
| KR | 20180083022 | A | 7/2018 |

OTHER PUBLICATIONS

Office Action for related Chinese Application No. 202080065822.1; action dated Mar. 30, 2023; (8 pages).

International Search Report for related International Application No. PCT/KR2020/012870; report dated Apr. 1, 2021; (6 pages).

Written Opinion for related International Application No. PCT/KR2020/012870; report dated Apr. 1, 2021; (8 pages).

* cited by examiner

COOLING APPARATUS FOR SUPERCONDUCTOR COOLING CONTAINER

CROSS-REFERENCE TO RELATED APPLICATIONS

This application is the National Stage filing under 35 U.S.C. 371 of International Application No. PCT/KR2020/012870, filed on Sep. 23, 2020, which claims the benefit of earlier filing date and right of priority to Korea utility model Application No. 10-2019-0117295 filed on Sep. 24, 2019, and Korea utility model Application No. 10-2020-0088974, filed on Jul. 17, 2020, the contents of which are all hereby incorporated by reference herein in their entirety.

FIELD

The present disclosure relates to a cooling apparatus for a superconductor cooling container.

BACKGROUND

In general, a cooling low-temperature container for cryogenically cooling a superconductor is manufactured in a form of a cylinder with a vacuum insulation structure that minimizes heat inflow thereto from an outside. The cooling low temperature container includes an outer container that maintains a vacuum state, and an inner container that is disposed inside the outer container and cools the superconductor to a cryogenic temperature.

The superconductor is placed in the inner container mainly containing nitrogen and thus is cooled therein. In this regard, a cryogenic freezer is used to cool liquid nitrogen.

In this regard, in order to form a compact system, the freezer is attached to a side face (a top of the liquid nitrogen) of a nitrogen tank as the inner container to generate natural convection of the liquid nitrogen in a gravity direction. A circular (ring-shaped) copper band is soldering or brazing-bonded to an outer wall of the inner container (nitrogen tank) to secure temperature uniformity in a circumferential direction of the nitrogen tank. In particular, the copper band is manufactured in a circular shape by rolling a copper plate of a certain thickness and milling a concave face thereof in contact with the outer wall of the nitrogen tank.

However, conventionally, in a process of manufacturing the copper band, as a size of the inner container increases, difficulty of manufacturing the copper band increases and a manufacturing cost gradually increases. When using the brazing, a vacuum furnace for heating is limited in size.

In addition, conventionally, an inner face of the copper band and an outer face of the inner container is bonded to each other using a filler metal therebetween. In this case, it is difficult to check a soldering or brazing state between the inner face of the copper band and the outer face of the inner container. Further, when the bonding is not performed properly, there is a difficulty in quality control, such as a significant decrease in heat transfer efficiency.

Therefore, there is a need to solve this problem.

A related background art includes Korea Patent No. 1046323 (Jun. 28, 2011, title of invention: cryogenic cooling method and apparatus for high-temperature superconductor device).

SUMMARY

The present disclosure is devised based on the above necessity. A purpose of the present disclosure is to provide a cooling apparatus for a superconductor cooling container in which a plurality of planar mount plates formed via planar machining are arranged around an inner container, and a plurality of heat transfer members are installed on the plurality of mount plates, respectively, and the heat transfer members are interconnected to each other via copper flexible members, such that cold air from a freezer is uniformly transferred to the inner container, thereby removing a conventional copper band, and reducing a manufacturing cost, and allowing a contact state of the heat transfer member to be reliably checked and thus quality control thereof to be easily performed.

In addition, a purpose of the present disclosure is to provide a cooling apparatus for a superconductor cooling container in which the existing copper band is removed and a middle body on which a cooling band as a cryogenic-state maintaining device is installed is separately manufactured by bending a steel plate, thereby securing cooling performance uniform over an entire circumference thereof, and reducing work difficulty and improving workability so that manufacturing time and cost may be reduced.

Technical Solutions

One aspect of the present disclosure provides a cooling apparatus for a superconductor cooling container, the apparatus comprising: an inner container received inside an outer container, wherein the inner container contains a liquid coolant in which the superconductor is immersed; a freezer disposed outside the outer container and configured to generate cold air; and a cryogenic-state maintaining device connected to the freezer and configured to maintain an inside of the inner container in a cryogenic state.

In one implementation of the cooling apparatus, the cryogenic-state maintaining device includes heat transfer means detachably coupled to and installed around the inner container, and face-contact the inner container.

In one implementation of the cooling apparatus, the heat transfer means includes: a plurality of mount plates arranged around the inner container and spaced from each other by a predefined spacing; a plurality of heat transfer members respectively attached to the plurality of mount plates and configured to transfer the cold air received from the freezer to the inner container; a fastener for separably fastening the heat transfer members to the inner container; and a flexible member for thermally connecting adjacent ones of the heat transfer members to each other.

In one implementation of the cooling apparatus, each of the mount plates is formed into a plane via plane machining, wherein each of the heat transfer members includes a copper block, wherein the flexible member includes a flexible copper braid In one implementation of the cooling apparatus, a contact force of each heat transfer member with each mount plate is determined by adjusting a fastening force of the fastener.

In one implementation of the cooling apparatus, the fastener includes: a plurality of bolt members mounted on the mount plate; a plurality of bolt receiving holes defined in the heat transfer member; and a plurality of nut members respectively fastened to the bolt members respectively fitted into the bolt receiving holes to bring the heat transfer members respectively into close contact with the mount plates.

In one implementation of the cooling apparatus, the flexible member is coupled to the heat transfer member via coupling means.

In one implementation of the cooling apparatus, the coupling means includes: a through-hole formed in the flexible member; and a coupling member inserted into the through-hole and coupled to the heat transfer member.

In one implementation of the cooling apparatus, the cryogenic-state maintaining device includes a cooling band, wherein the inner container includes: a tubular upper body opened in a vertical direction; a lower body having an open top and a blocked bottom; and a middle body formed in a tubular shape and connected to and disposed between the upper body and the lower body, wherein the cooling band is installed on an outer circumferential face of the middle body.

In one implementation of the cooling apparatus, the middle body includes a body plate having a regular polygonal shape in a plan view, wherein each of planar portions of the body plate has a thickness uniform across an entire area thereof.

In one implementation of the cooling apparatus, the body plate is manufactured by repeatedly bending a rectangular steel plate multiple times by a regular distance in a longitudinal direction thereof, and then, welding both opposite ends thereof to each other.

In one implementation of the cooling apparatus, a plurality of stud bolts are welded to the planar portion.

In one implementation of the cooling apparatus, a welded plate for securing a welding area of each of the upper body and the lower body is welded to each of a top and a bottom of the body plate.

In one implementation of the cooling apparatus, the welded plate has a flat ring shape, and is constructed such that an outer circumferential face of the welded plate has a regular polygonal shape coincident with the regular polygonal shape of an outer circumferential face of the body plate, and an inner circumferential of the welded plate has a circular shape and protrudes radially inward beyond an inner circumferential face of the body plate.

In one implementation of the cooling apparatus, a cooling band is installed around and on an outer circumferential face of the body plate.

In one implementation of the cooling apparatus, the cooling band includes a plurality of copper blocks and a flexible joint for connecting adjacent ones of the copper blocks.

In one implementation of the cooling apparatus, the copper block includes a flat rectangular plate, wherein the same number of bolt holes as the number of the stud bolts installed on each of the planar portions of the body plate are defined in each copper block, wherein each stud bolt is inserted into each bolt hole such that each copper block is brought into close contact with each planar portion of the body plate, wherein each nut is fastened to each stud bolt.

Technical Effects

In the cooling apparatus for the superconductor cooling container according to the present disclosure, the plurality of planar mount plates formed via planar machining are arranged around the inner container, and the plurality of heat transfer members are installed on the plurality of mount plates, respectively, and the heat transfer members are interconnected to each other via the copper flexible members, such that cold air from the freezer is uniformly transferred to the inner container, thereby removing a conventional copper band, and reducing a manufacturing cost, and allowing a contact state of the heat transfer member to be reliably checked and thus quality control thereof to be easily performed.

In addition, in the cooling apparatus for the superconductor cooling container according to the present disclosure, the middle body on which the cooling band as a cryogenic-state maintaining device is installed is separately manufactured by bending a steel plate, thereby securing cooling performance uniform over an entire circumference thereof, and reducing work difficulty and improving workability so that manufacturing time and cost may be reduced.

DETAILED DESCRIPTION

Figure 1:
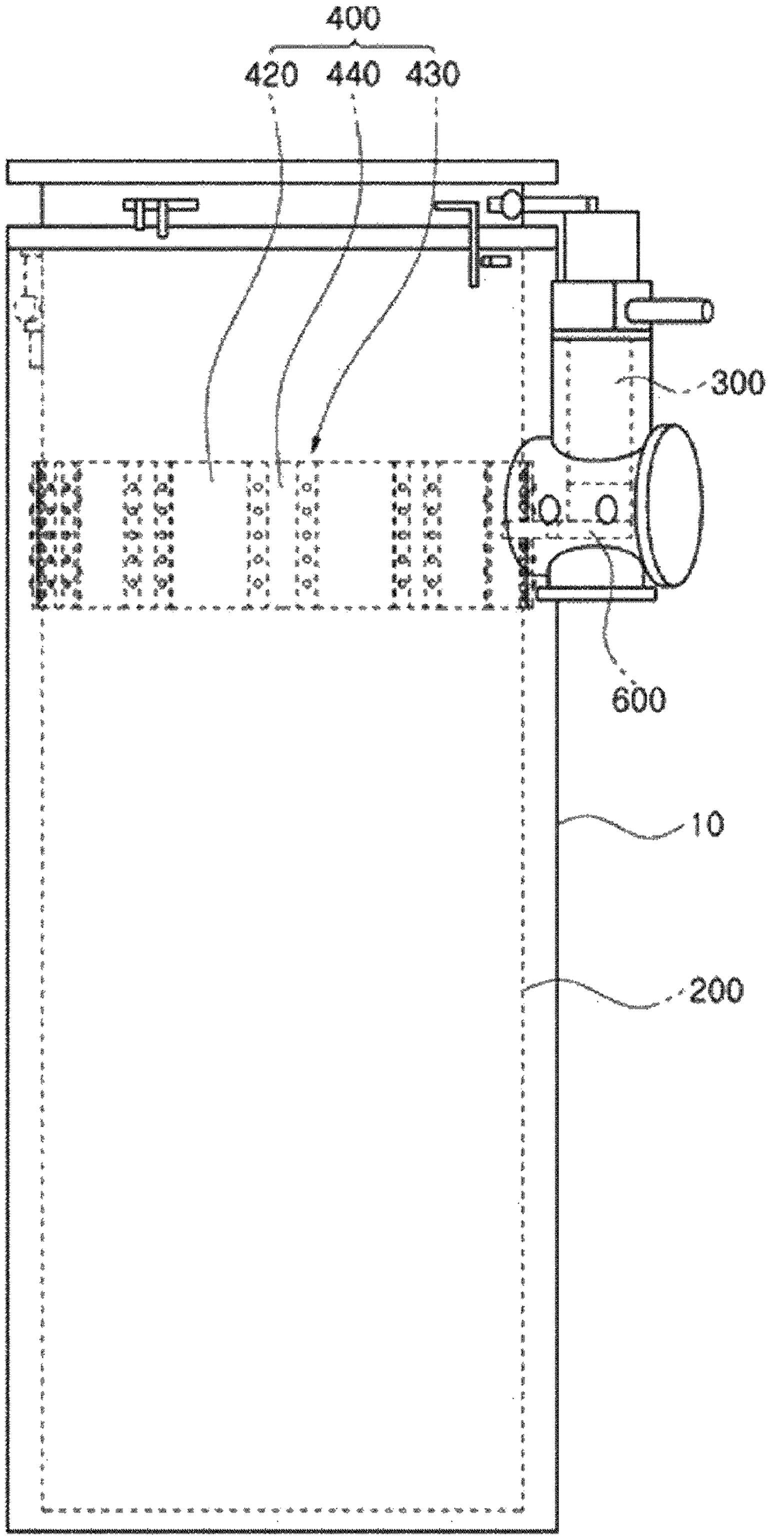
FIG. 1 is a perspective view of a cooling apparatus for a superconductor cooling container according to an embodiment of the present disclosure.

Hereinafter, a cooling apparatus for a superconductor cooling container according to an embodiment of the present disclosure will be described with reference to the accompanying drawings.

In this process, a thickness of a line or a size of each of components shown in the drawings may be exaggerated for clarity and convenience of illustration. In addition, terms to be described later are defined in consideration of functions in the present disclosure, and may vary according to intentions of users and operators or customs. Therefore, definitions of these terms should be made based on contents throughout the present disclosure.

Figure 2:
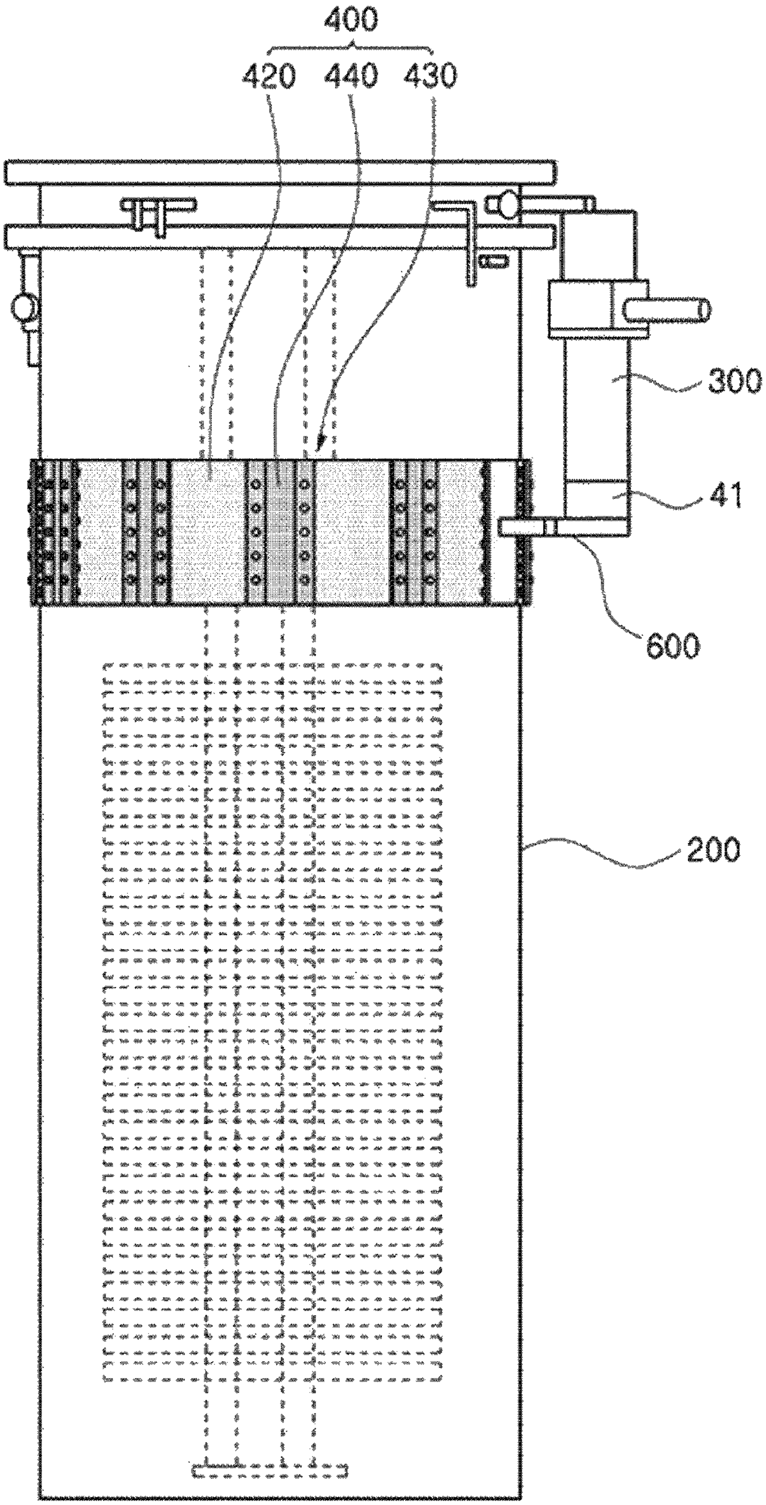
FIG. 2 is a perspective view showing an inner container of the cooling apparatus for the superconductor cooling container according to an embodiment of the present disclosure.
Figure 3:
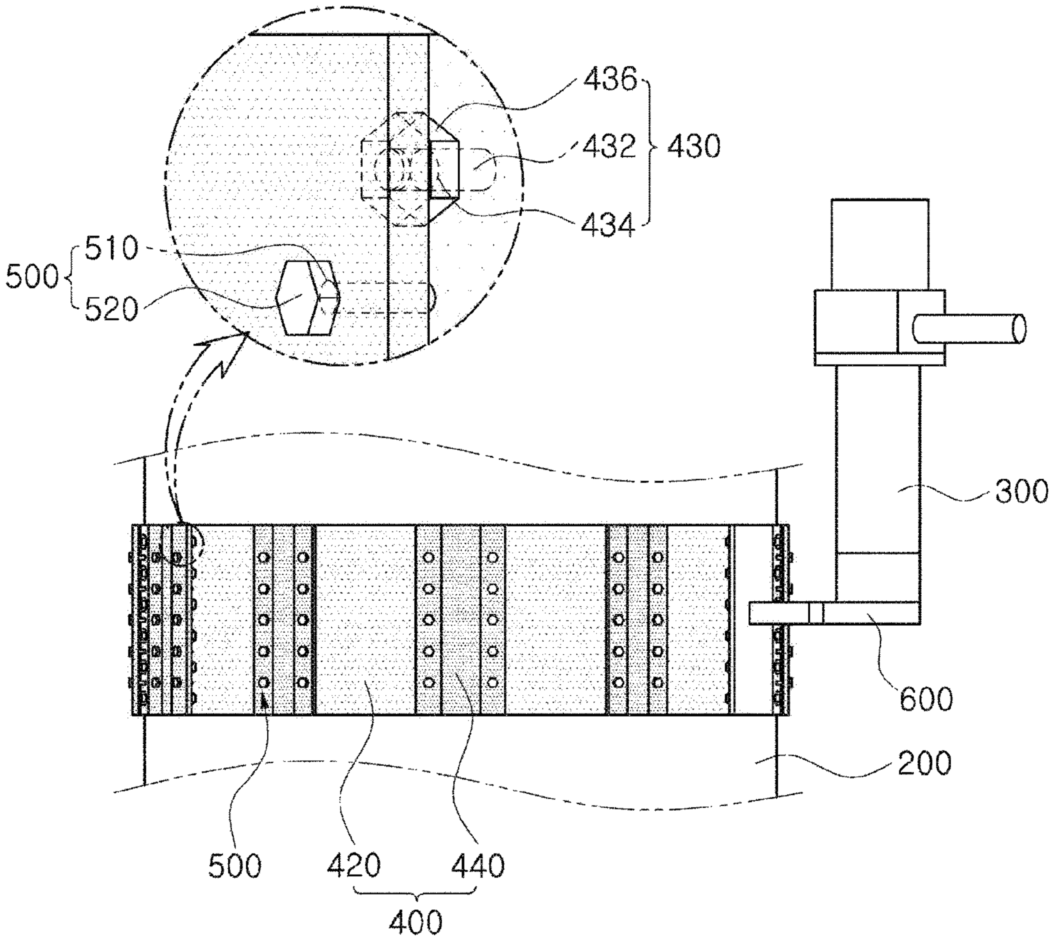
FIG. 3 is a detailed assembly perspective view of heat transfer means in the inner container of the cooling apparatus for the superconductor cooling container according to an embodiment of the present disclosure.
Figure 4:
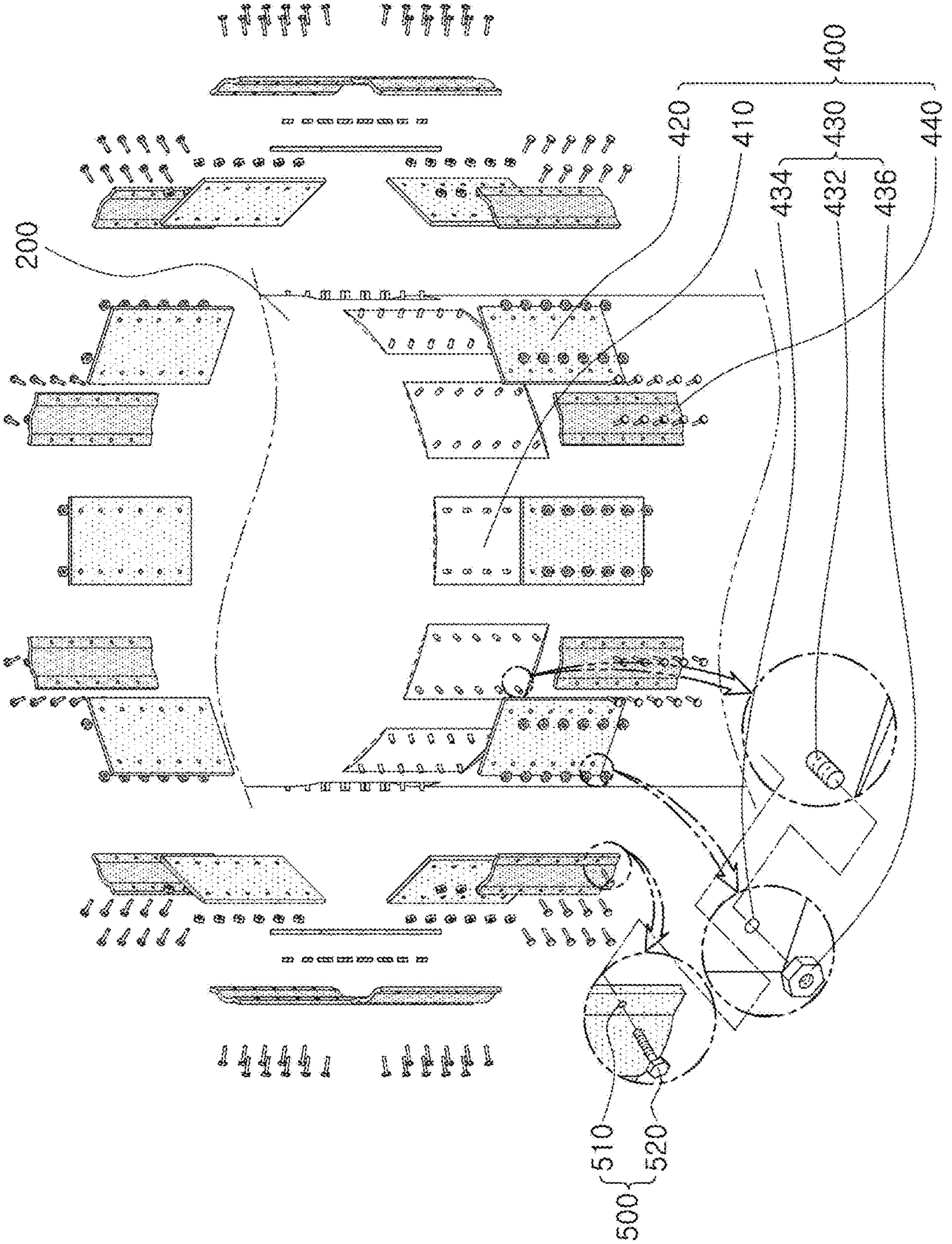
FIG. 4 is an exploded perspective view of the heat transfer means, in the inner container of the cooling apparatus for the superconductor cooling container according to an embodiment of the present disclosure.
Figure 5:
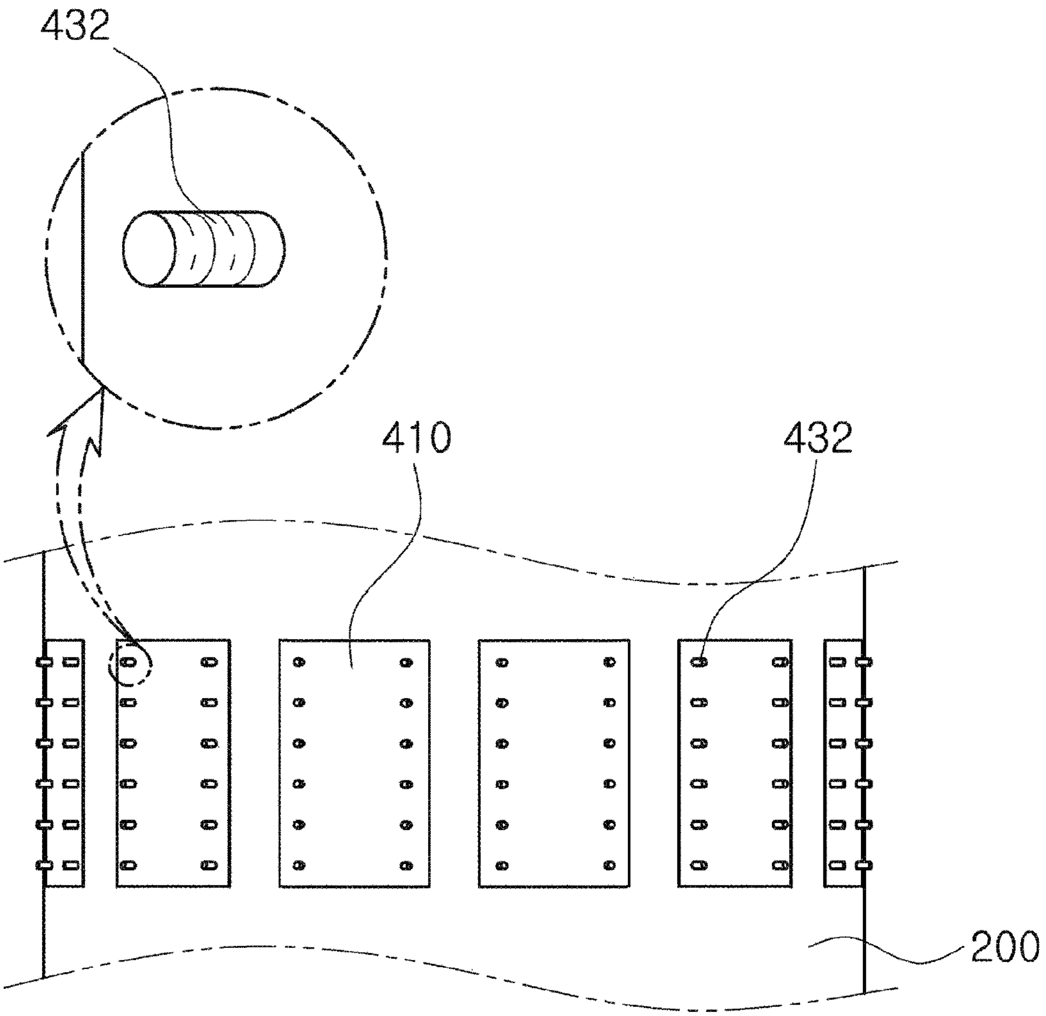
FIG. 5 is a state diagram in which a mount plate around the inner container of the cooling apparatus for the superconductor cooling container according to an embodiment of the present disclosure is subjected to planar machining.
Figure 6:
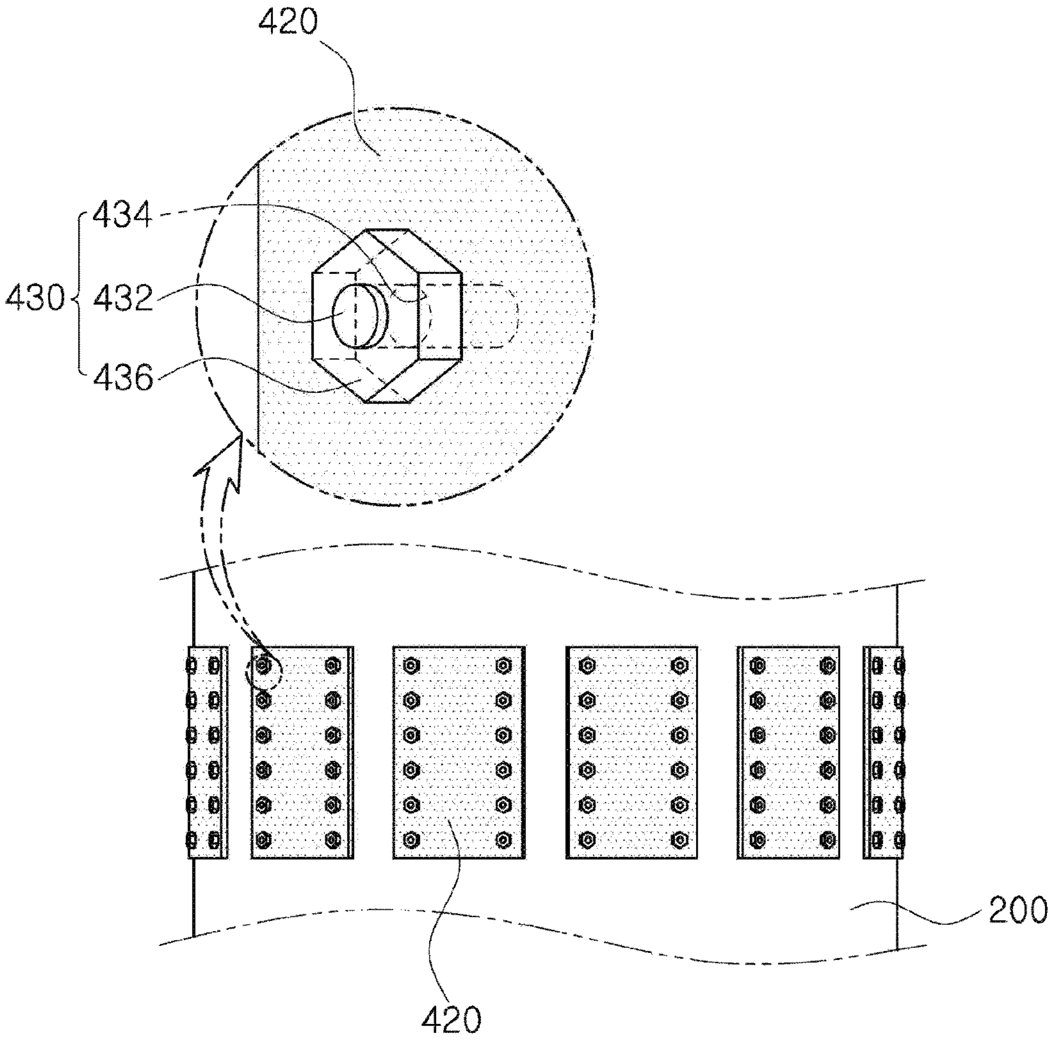
FIG. 6 is a state diagram in which a heat transfer member is mounted on the mount plate of the cooling apparatus for the superconductor cooling container according to an embodiment of the present disclosure.
Figure 7:
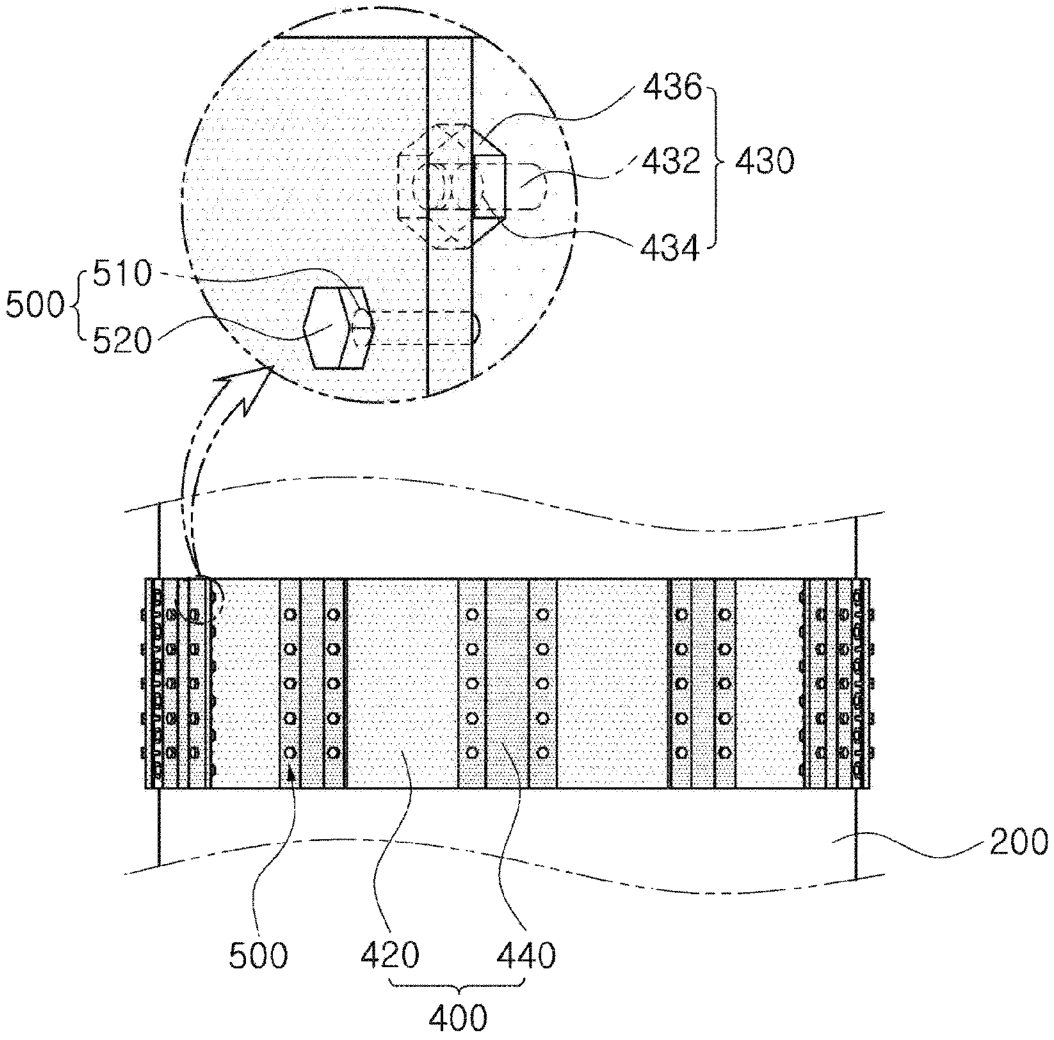
FIG. 7 is a state diagram in which a flexible member is coupled to the heat transfer member of the inner container of the cooling apparatus for the superconductor cooling container according to an embodiment of the present disclosure.
Figure 8:
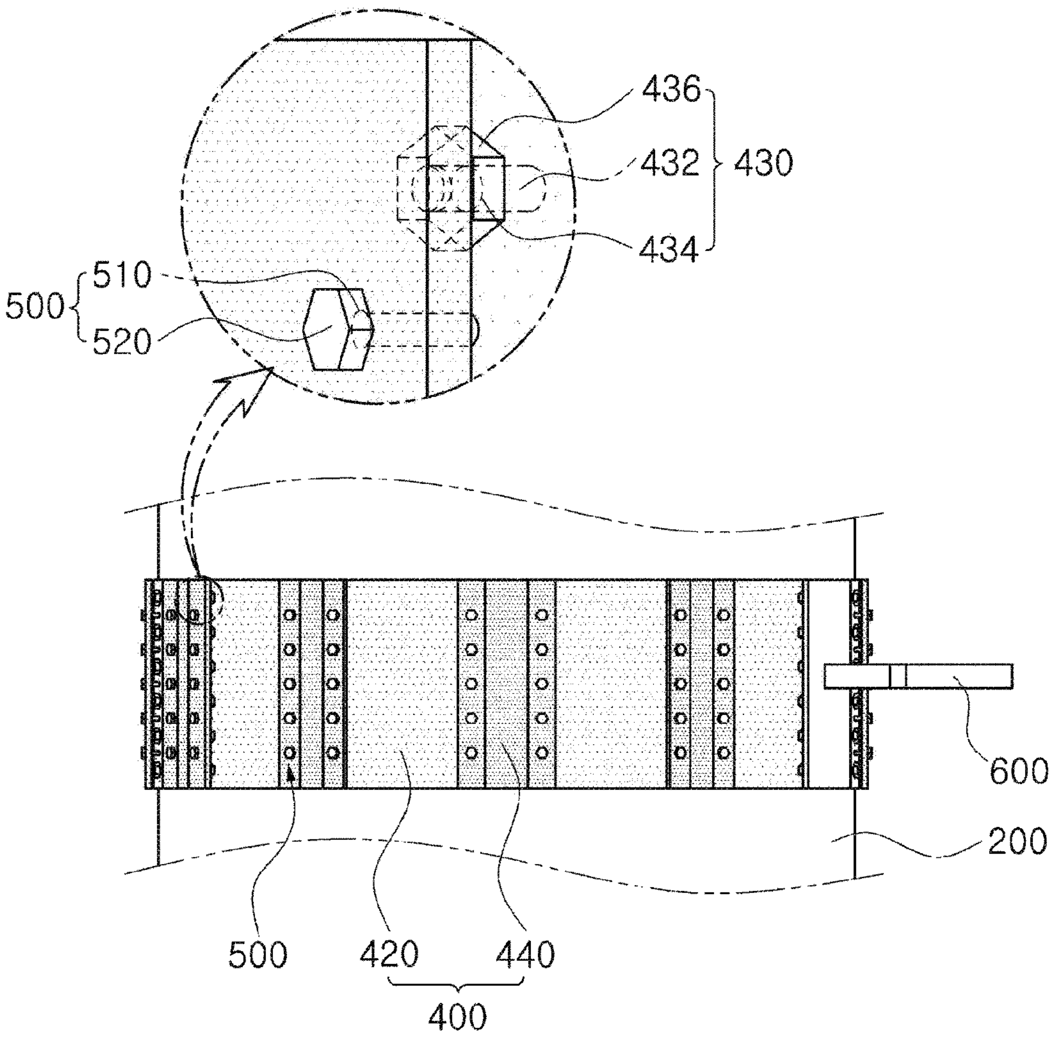
FIG. 8 is a state diagram in which a freezer installation member is mounted on the heat transfer member of the inner container of the cooling apparatus for the superconductor cooling container according to an embodiment of the present disclosure.
Figure 9:
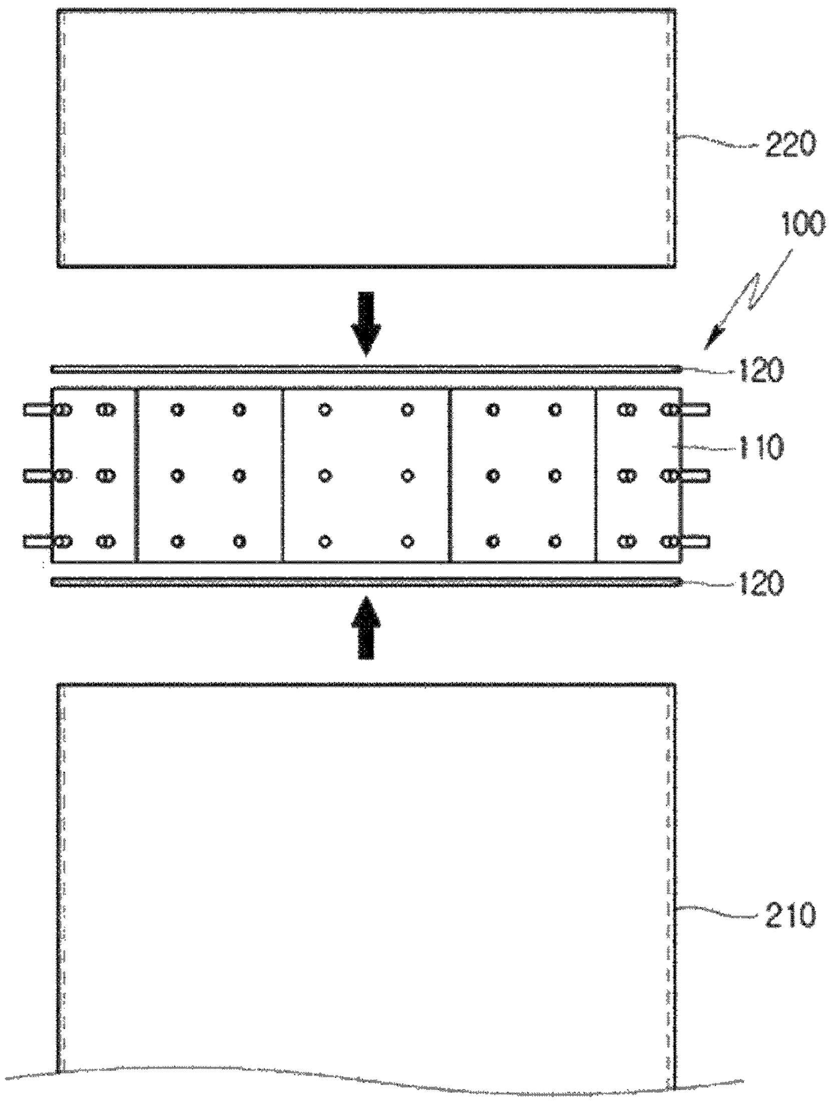
FIG. 9 is an exploded view of the inner container of the cooling apparatus for a superconductor cooling container according to an embodiment of the present disclosure.
Figure 10:
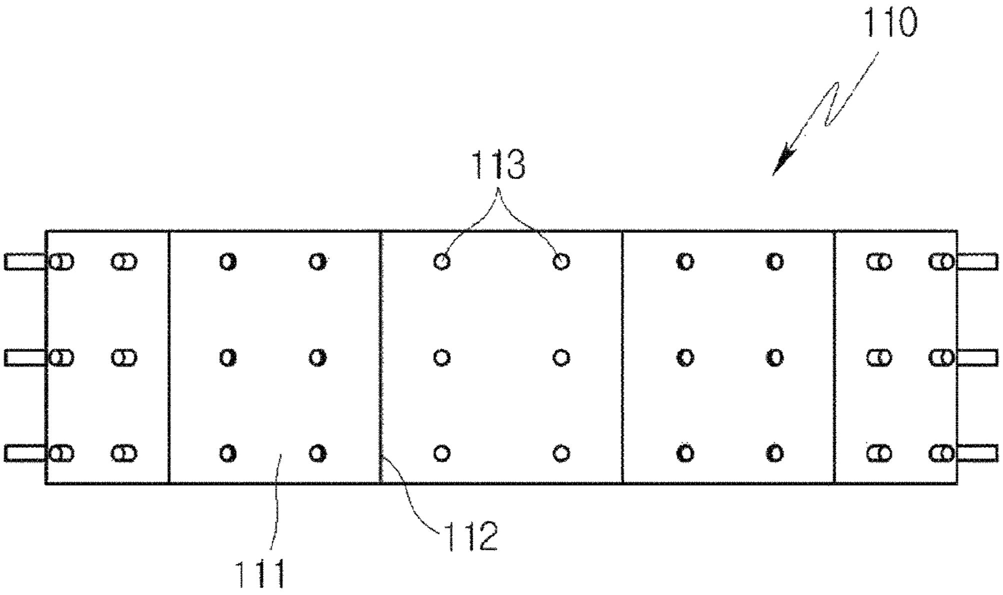
FIG. 10 is a front view of a body plate as a component of a middle body of the cooling apparatus for the superconductor cooling container according to an embodiment of the present disclosure.
Figure 11:
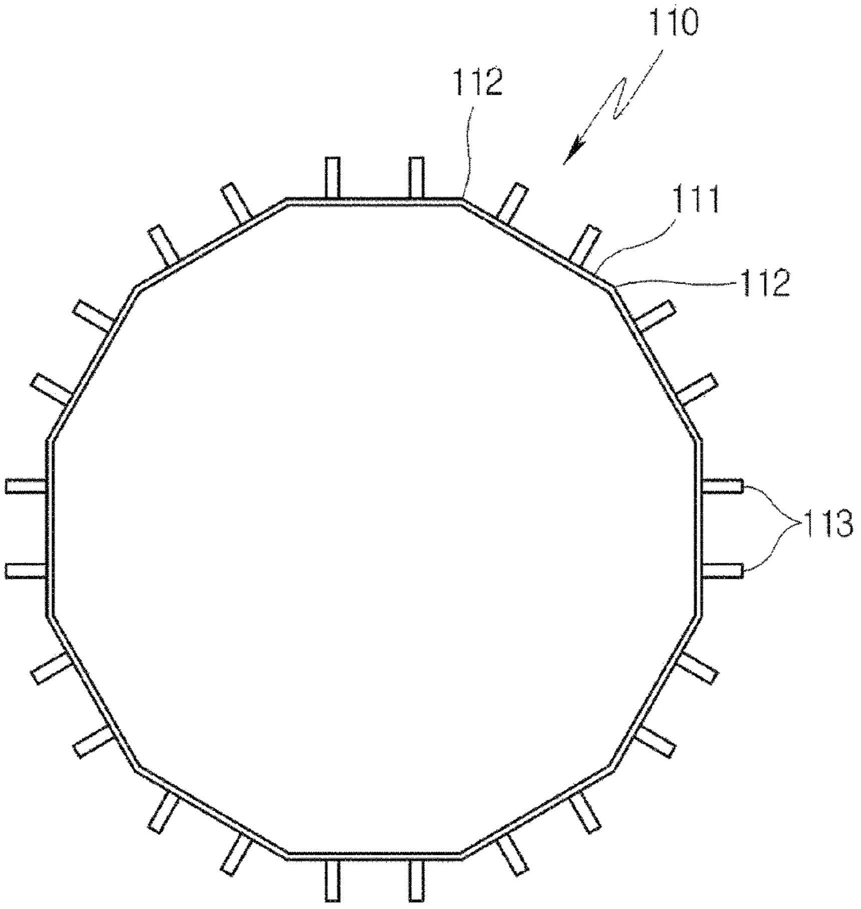
FIG. 11 is a plan view of the body plate as a component of the middle body of the cooling apparatus for the superconductor cooling container according to an embodiment of the present disclosure.
Figure 12:
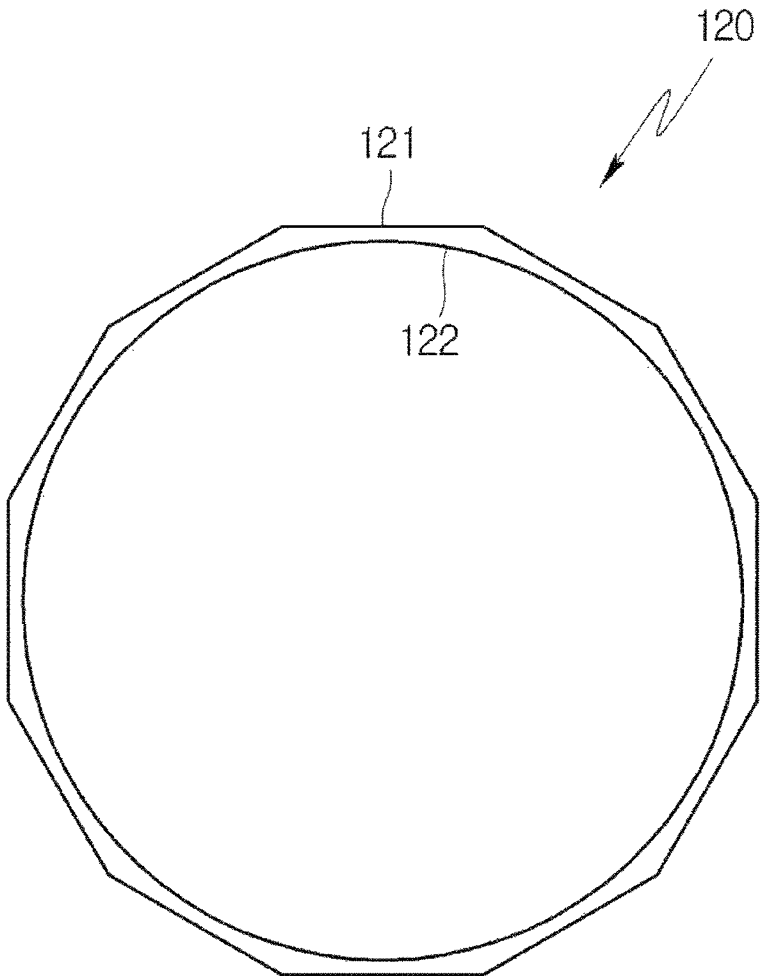
FIG. 12 is a plan view of a welded plate as a component of the middle body of the cooling apparatus for the superconductor cooling container according to an embodiment of the present disclosure.
Figure 13:
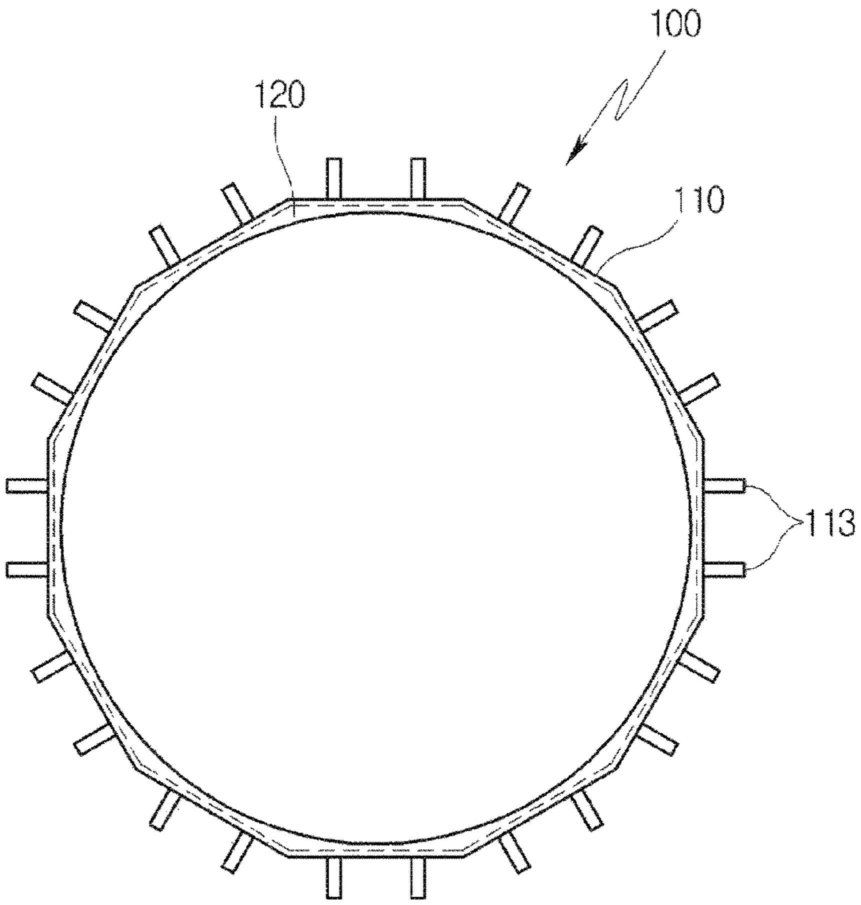
FIG. 13 is a plan view of the middle body of the cooling apparatus for the superconductor cooling container according to an embodiment of the present disclosure.
Figure 14:
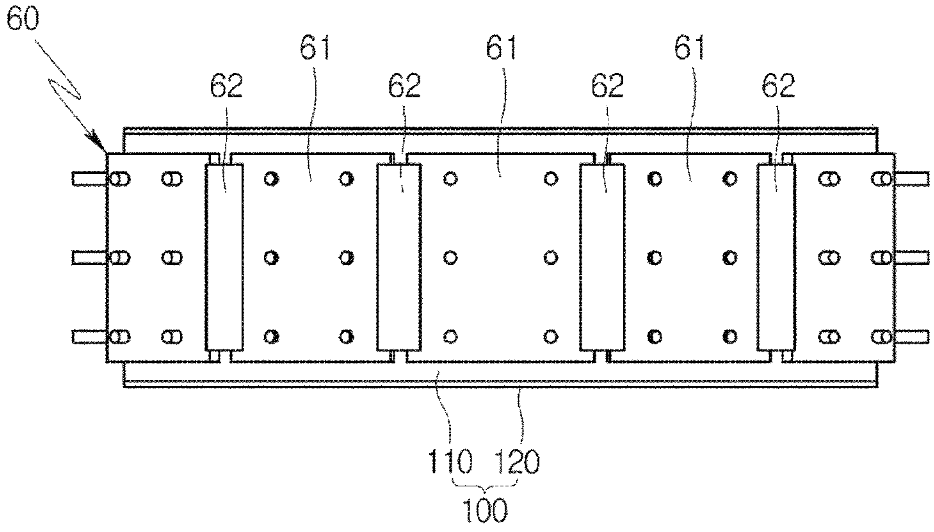
FIG. 14 is a diagram of an assembled state of a cooling band of the cooling apparatus for the superconductor cooling container according to an embodiment of the present disclosure.

FIG. 1 is a perspective view of a cooling apparatus for a superconductor cooling container according to an embodiment of the present disclosure. FIG. 2 is a perspective view showing an inner container of the cooling apparatus for the superconductor cooling container according to an embodiment of the present disclosure. FIG. 3 is a detailed assembly perspective view of heat transfer means in the inner container of the cooling apparatus for the superconductor cooling container according to an embodiment of the present disclosure. FIG. 4 is an exploded perspective view of the heat transfer means, in the inner container of the cooling apparatus for the superconductor cooling container according to an embodiment of the present disclosure. FIG. 5 is a state diagram in which a mount plate around the inner container of the cooling apparatus for the superconductor cooling container according to an embodiment of the present disclosure is subjected to planar machining. FIG. 6 is a state diagram in which a heat transfer member is mounted on the mount plate of the cooling apparatus for the superconductor cooling container according to an embodiment of the present disclosure. FIG. 7 is a state diagram in which a flexible member is coupled to the heat transfer member of the inner container of the cooling apparatus for the superconductor cooling container according to an embodiment of the present disclosure. FIG. 8 is a state diagram in which a freezer installation member is mounted on the heat transfer member of the inner container of the cooling apparatus for the superconductor cooling container according to an embodiment of the present disclosure. FIG. 9 is an exploded view of the inner container of the cooling apparatus for a superconductor cooling container according to an embodiment of the present disclosure. FIG. 10 is a front view of a body plate as a component of a middle body of the cooling apparatus for the superconductor cooling container according to an embodiment of the present disclosure. FIG. 11 is a plan view of the body plate as a component of the middle body of the cooling apparatus for the superconductor cooling container according to an embodiment of the present disclosure. FIG. 12 is a plan view of a welded plate as a component of the middle body of the cooling apparatus for the superconductor cooling container according to an embodiment of the present disclosure. FIG. 13 is a plan view of the middle body of the cooling apparatus for the superconductor cooling container according to an embodiment of the present disclosure. FIG. 14 is a diagram of an assembled state of a cooling band of the cooling apparatus for the superconductor cooling container according to an embodiment of the present disclosure.

Referring to FIG. 1 to FIG. 8, the cooling apparatus for the superconductor cooling container according to an embodiment of the present disclosure includes an outer container 10, an inner container 200, a freezer 300 and a cryogenic-state maintaining device (not shown).

The outer container 10 is a component made of a heat insulating material. The outer container 10 is disposed around the inner container 200 and is spaced apart from the inner container 200 by a predefined spacing so that thermal insulation of the inner container 200 is maintained.

The inner container 200 is received inside the outer container 10 and is a component for receiving therein liquid coolant in which a superconductor is immersed. The superconductor is a conductor that exhibits a superconducting phenomenon in which electrical resistance is closer to zero at a very low temperature. A magnetic field cannot invade into the superconductor. The superconductor pushes an internal magnetic field therein to an outside. The superconductor exhibits magnetic levitation in which the superconductor levitates on top of a magnet.

The freezer 300 is a component that is disposed outside the outer container 10 so as to generate cold air. The freezer 300 generates the cold air and transfers cold air uniform in a circumferential direction to a circumference of the inner container 100 via heat transfer means 400 to uniformly deliver the cold air to a top of liquid nitrogen as the liquid coolant stored in the nitrogen tank as the inner container 200 such that the superconductor maintains a cryogenic state thereof.

The cryogenic-state maintaining device delivers the cold air uniform in the circumferential direction to the circumference of the inner container to keep the inside of the inner container to be in the cryogenic state. In an embodiment of the present disclosure, the cryogenic-state maintaining device may be the heat transfer means 400. Hereinafter, an example in which the cryogenic-state maintaining device is embodied as the heat transfer means 400 will be described.

The heat transfer means 400 is connected to the freezer 300 and is detachably coupled to the inner container 200 and face-contacts the inner container 200 and extends around the inner container 200.

The heat transfer means 400 includes a plurality of mount plates 410 arranged around the inner container 200 and spaced from each other by a predefined spacing, a plurality of heat transfer members 420 respectively attached to the mount plates 410 to transfer the cold air received from the freezer 300 to the inner container 200, fasteners 430 for removably fastening the heat transfer members 420 to the inner container 200, and a flexible member 440 for thermally connecting adjacent heat transfer members 420 to each other.

The mount plate 410 is formed into a plane via plane machining. The mount plate 410 may be formed into a plane via face milling.

The heat transfer member 420 includes a copper block.

The flexible member 440 may include a flexible copper braid.

Each of the heat transfer member 420 and the flexible member 440 may be made of any material other than copper, as long as it is a metal material with excellent heat transfer efficiency.

The heat transfer member 420 is characterized in that a contact force thereof with the mount plate 410 is determined by adjusting a fastening force of the fastener 430.

As the fastening force (torque) of the fastener 430 increases and thus the adhesion increases, the heat transfer efficiency of the heat transfer member 420 may be improved.

An installation member 600 connected to the freezer 300 is disposed on a side face of the heat transfer member 420. The installation member 600 is formed so as to be changeable into various shapes, so that the cold air is efficiently transferred from the freezer 300 to the heat transfer member 420.

Each of the fasteners 330 includes each of a plurality of a bolt member 432 mounted to the mount plate 410, each of a plurality of bolt receiving holes 434 formed in the heat transfer member 420, and each of a plurality of nut members 436 which is fastened to each bolt member 432 fitted into the bolt receiving hole 434 to tightly attaching the heat transfer member 420 to the mount plate 410.

The bolt member 432 may include a stud bolt.

The bolt member 432 is screwed into each of screw holes arranged along a circumference of the inner container 200. Alternatively, a head of the bolt member 432 is inserted into each of fitting holes arranged along the circumference of the inner container 200 and is welded thereto. That is, the bolt members 432 may be installed around the circumference of the inner container 200 in various ways.

The flexible member 440 is coupled to the heat transfer member 420 via coupling means 500.

The coupling means 500 includes a through-hole 510 formed in the flexible member 440 and a coupling member 520 inserted into the through-hole 510 and coupled to the heat transfer member 420.

The coupling member 520 may include a bolt or a screw.

When the flexible member 440 is coupled to the heat transfer member 420 using the coupling member 520, the coupling member 520 may be coupled to the nut member 436 of the heat transfer member 420 or is fastened to the screw hole formed in the heat transfer member 420, such that the flexible member 440 may be thermally and uniformly connected to the heat transfer member 420.

Hereinafter, an operation and effects of the cooling apparatus for the superconductor cooling container according to an embodiment of the present disclosure will be described with reference to the accompanying drawings.

The plurality of planar mount plates 410 formed via the milling are arranged around the inner container 200 in the circumferential direction thereof and are spaced from each other by a predefined spacing. Then, the plurality of bolt members 432 are fixed to the mount plates 410 via welding.

Subsequently, the bolt receiving hole 434 is formed at a position corresponding to the bolt member 432 in the heat transfer member 420 composed of the copper block, and the bolt member 432 is inserted into the bolt receiving hole 434. An appropriate torque is applied thereto using the nut member 436 coupled to the bolt member such that the heat transfer member 420 may be tightly attached to the mount plate 410.

Conventionally, the copper band in a circular shape is installed around the inner container and is bonded thereto using the soldering or brazing. Thus, it is difficult to check the welding state and control the quality thereof. However, in accordance with the present disclosure, the contact force between the heat transfer member 420 and the mount plate 410 may be controlled via a bolt-nut combination, such that the quality control may be made easily.

Next, the coupling member 520 is inserted through the through-hole 510 of the flexible member 440 to couple the member 440 to the heat transfer member 420, such that the flexible member 440 may be thermally uniformly coupled to the heat transfer member 420.

In addition, the installation member 600 is installed on an outer face of the heat transfer member 420 and the freezer 300 is connected to the installation member 600. Thus, the installation operation is completed.

In this state, when the freezer 300 operates, the generated cold air therefrom is transferred to the heat transfer member 420 through the installation member 600. Thus, a thermally uniform state between the heat transfer members 420 is maintained via the flexible member 440. Then, the cold air is transmitted to the inside of the inner container 200 through the outer face of the inner container 200, such that the superconductor contained in the liquid nitrogen inside may be maintained in a cryogenic state.

Therefore, in the cooling apparatus for the superconductor cooling container according to an embodiment of the present disclosure, the plurality of planar mount plates formed via the planar machining are arranged around the inner container, and the plurality of heat transfer members are installed on the plurality of mount plates, respectively, and the heat transfer members are interconnected to each other via the copper flexible members, such that the cold air of the freezer is uniformly transferred to the inner container, thereby removing the conventional copper band, and reducing the manufacturing cost, and allowing the contact state of the heat transfer member to be reliably checked and thus quality control thereof to be easily performed.

In another embodiment of the present disclosure, the cryogenic cooling device of the cooling apparatus for the superconductor cooling container may be embodied as a cooling band 60. That is, the inner container may be maintained in a cryogenic state via the cooling band 60. Hereinafter, an example in which the cryogenic cooling device is embodied as the cooling band 60 will be described.

As shown in FIG. 9, the inner container 200 according to the present disclosure is divided into a lower body 210, a middle body 100 and an upper body 220.

The lower body 210 has a cylindrical shape and constitutes a portion of the inner container 200 below the cooling band 60. The lower body has a blocked bottom, and an open top.

The upper body 220 has a cylindrical shape and is made of the same material as, has the same diameter, and the same thickness as those of the lower body 210, and constitutes a portion of the inner container 200 above the cooling band 60.

The middle body 100 constitutes a portion of the inner container 200 on which the cooling band 60 as the cryogenic cooling device is positioned, and constitutes a wall of a partial section in a vertical direction of the inner container 200. The freezer 300 is installed on one side of the inner container 200. A cooling head 41 of the freezer 300 is connected to the cooling band 60. The cooling band 60 is installed on and around the outer circumferential face of the inner container 200. Therefore, heat inside the inner container 200 is transferred to the cooling head 41 of the freezer 300 through the cooling band 60 and thus is removed away therefrom, so that the liquid nitrogen inside the inner container 200 maintains a liquid state thereof, thereby maintaining a superconductor module at the cryogenic state.

The middle body 100 includes a body plate 110, two welded plates 120 mounted on a top and a bottom of the body plate, respectively, and a plurality of stud bolts 130 installed on a side face of the body plate 110.

As shown in FIG. 10 and FIG. 11, the body plate 110 is a pipe-type structure having a regular polygonal planar shape. FIG. 11 shows an embodiment of a regular dodecagonal shape in which the number of planar portions 111 is 12. However, the number of planar portions 111 may be appropriately changed based on a size of the inner container 200.

The body plate 110 is manufactured by bending an elongate rectangular steel plate several times and welding both ends thereof to each other. That is, the body plate 110 is originally formed in a shape of a flat plate. Then, the plate is repeatedly bent by a regular spacing along a longitudinal direction to form a plurality of planar portions 111. A corner portion 112 is formed between adjacent planar portions 111. Sizes of internal angles of all of the corner portions 112 are equal to each other.

Each of the planar portions 111 of the body plate 110 has an original planar state of the steel plate as it is. Thus, planarity and roughness thereof are significantly excellent than those in a conventional case in which a face of a round pipe is cut away to form a planar face.

Moreover, as shown, each of the planar portions 111 has a thickness uniform along a lateral direction. This is applied to all the planar portions 111.

Therefore, since the body plate 110 has the uniform thickness across an entirety thereof in a circumferential direction, the middle body 100 has uniform thermal conductivity in a radial direction across an entirety thereof in the circumferential direction.

The plurality of stud bolts 113 are installed on the outer face of the planar portion 111. The stud bolt 113 is fixed to the body plate 110 such that one end of the bolt 113 is welded to the planar portion 111. FIG. 10 shows an embodiment in which a total of six stud bolts 113 arranged in two columns and three rows are installed on one planar portion 111. However, this is an example. The number and the arrangement of the bolts 113 may vary based on a size of a copper block 61 (see FIG. 14) of the cooling band 60.

The upper body 220 and the lower body 210 are respectively connected to the top and the bottom of the body plate 110 via welding. In this regard, the welded plate 120 is first welded to each of the top and the bottom of the body plate 110 to secure a sufficient bonding area.

As shown in FIG. 12, the welded plate 120 is a flat plate made of the same material as that of the body plate 110, and has a planar circular ring shape. In more detail, an outer circumferential face 121 of the welded plate 120 is formed in the same regular polygonal shape as that of the body plate 110, and an inner circumferential face 122 thereof is formed in a circular shape.

The inner circumferential face 122 of the welded plate 120 protrudes radially inwardly beyond the inner face of the body plate 110, thereby not only securing a sufficient welding area, but also improving structural rigidity of the body plate 110, that is, the middle body 100.

The welded plate 120 of this shape may be manufactured by laser cutting a steel plate.

A distance between the planar portions facing each other on the outer circumferential face 121 of the welded plate 120 is the same as a distance between the planar portions 111 facing each other on the outer circumferential face of the body plate 110.

FIG. 13 shows a state in which the upper welded plate 120 is welded to the top of the body plate 110. The outer circumferential faces of the body plate 110 and the upper welded plate 120 exactly coincide each other. Regarding the inner circumferential faces (indicated by a dotted line) thereof, the inner circumferential face 122 of the upper welded plate 120 protrudes inwardly in the radial direction beyond the inner circumferential face of the body plate 110.

The same structure may be applied to the lower welded plate 120 welded to the bottom of the body plate 110. In this way, the fabrication of the middle body 100 is completed.

As described above, the ring-shaped welded plate 120 is mounted on each of the top and the bottom of the body plate 110 so that the body plate 110 may more robustly cope with a lateral external force. That is, the structural rigidity of the middle body 100 is improved due to the welded plates 120.

Thereafter, the inner container 200 is completed by welding the upper body 220 and the lower body 210 to the top and the bottom of the middle body 100, respectively, as shown in FIG. 9.

In this regard, a sufficient welding area of each of the upper body 220 and the lower body 210 may be secured due to the welded plates 120 respectively installed on the top and the bottom of the body plate 110, so that the upper body 220, the middle body 100, the lower body 210 are firmly welded and bonded to each other. Thus, the inner container 200 may have sufficient pressure resistance.

FIG. 14 shows a state in which the cooling band 60 is installed on the outer circumferential face of the middle body 100. The cooling band 60 includes a plurality of copper blocks 61 and a flexible joint 62 connecting the adjacent copper blocks 61 to each other.

The copper block 61 is embodied as a rectangular flat plate having a predetermined thickness. One copper block is mounted on each planar portion 111 of the body plate 110. For this purpose, the same number of bolt holes as the number of the stud bolts 113 on the body plate 110 are formed in the copper block 61. The copper block 61 is brought into close contact with the planar portion 111 of the body plate 110 in a state in which the stud bolt 113 is inserted into the bolt hole. Then, a nut is fastened to the stud bolt 113 so that the copper block 61 is fixed to the body plate 110 in a state in which the block 61 is in close face-contact with the planar portion 111.

Thereafter, adjacent copper blocks 61 are connected to each other via the flexible joint 62. The flexible joint 62 is made of the same copper material as that of the copper block 61 and has a large contact area so that the heat transfer may be made smoothly between the copper block 61 and the copper block 61 adjacent to each other. Since a structure of the flexible joint 62 itself is not a main subject of the present disclosure, a detailed description thereof will be omitted.

An example in which the cooling band 60 is installed after the production of the inner container 200 is completed has been described above. However, the disclosure is not limited thereto. An installation of the cooling band 60 on the middle body 100 may be carried out in an independent state before the upper body 220 and the lower body 210 are welded to the middle body 100. In this case, the installation of the cooling band 60 is performed on the middle body 100 while handling only the middle body. Thus, the installation may be able to proceed more easily compared to the case of installing the cooling band 60 while handling the entirety of the inner container 200.

The cooling band 60 installed on the outer face of the inner container 200 is connected to the cooling head of the freezer 300 via a connecting member made of the same copper material as that of the head, as described above. Therefore, heat exchange is made between the liquid nitrogen inside the inner container 200 and the cooling head 41 of the freezer 300 so that the temperature of the liquid nitrogen may be continuously maintained at a cryogenic state at which the superconductor module may maintain a superconducting state thereof.

Hereinafter, the effects of the present disclosure will be described.

As described above, the inner container 200 according to the present disclosure is manufactured by separately manufacturing the middle body 100 on which the cooling band 60 is installed, and the upper body 220 and the lower body 210, and then welding the upper, middle, and lower bodies to each other.

The body plate 110 which is a main component constituting the middle body 100 is manufactured by bending the elongate rectangular steel plate a number of times by a regular spacing. Thus, the planar portion 111 between the bending lines, that is, the corner portions 112 may maintain the flat state of the steel plate as the raw material as it is, and thus has excellent flatness and roughness. Further, the planar portion 111 has the thickness uniform over an entire area thereof.

Therefore, the copper block 61 of the cooling band 60 may be mounted to the planar portion 111 in a closely contact manner therewith. This may allow smooth transferring of the heat between the liquid nitrogen and the cooling head 41 of the freezer 300 via the middle body 100 and the cooling band 60, such that the cooling performance of the inner container 200 is improved.

In addition, the planar portion 111 has the thickness uniform over an entire area thereof. Thus, the planar portion has uniform thermal conductivity regardless of the locations. The planar portions 111 are arranged along an entirety of the middle body 100 in a circumferential direction thereof, thereby ensuring uniform cooling performance over the entire circumference thereof. This means that an entirety of a superconducting wire rod of the superconductor module may maintain a uniform superconducting state regardless of the position in the inner container 200, so that operating performance of a superconducting fault current limiter may be more stabilized and improved.

In addition, the planar portion 111 of the body plate 110 is formed by bending a flat plate material. Thus, the planar portion 111 may be more easily formed than in the conventional case of directly cutting the outer face of a low-temperature container to machine a plane. Accordingly, not only the manufacturing process of the inner container 200 becomes easier, but also the manufacturing cost thereof is reduced.

In addition, the thickness of the planar portion 111 of the body plate 110 is uniform over an entire area thereof. Thus, there is no need to consider an exact amount of welding heat based on a location to prevent deformation of the planar portion 111 when welding the stud bolt 13. Thus, the workability is further improved and working speed is faster.

In addition, when welding the stud bolt 13, the welding is not carried out in the completed state of the inner container 200 as in the prior art, but is performed on the middle body 100 having a relatively small size and light weight, so that the work becomes simpler.

As described above, the overall manufacturing process of the inner container 200 is facilitated and takes a smaller time, thereby reducing a production cost.

In the cooling apparatus for the superconductor cooling container according to an embodiment of the present disclosure, the existing copper band is removed but the plurality of mount plates and the heat transfer members are arranged around the inner container. Alternatively, the inner container are divided into the upper, middle, and lower bodies and the cooling band is installed on the middle body, such that the cold air of the freezer is uniformly transferred to the inner container, and quality control thereof may be performed easily. Although the present disclosure has been described with reference to the embodiment shown in the drawings, this is merely exemplary, and various modifications and equivalent other embodiments are possible to those of ordinary skill in the art to which the present disclosure belongs.

Therefore, the true technical protection scope of the present disclosure should be defined based on the following claims.

What is claimed is:

1. A cooling apparatus for a superconductor cooling container, the apparatus comprising:
- an inner container received inside an outer container, wherein the inner container contains a liquid coolant in which the superconductor is immersed;
- a freezer disposed outside the outer container and configured to generate cold air; and
- a cryogenic-state maintaining device connected to the freezer and configured to maintain an inside of the inner container in a cryogenic state, including heat transfer means detachably coupled to and installed around the inner container, and facing and in contact with the inner container.

2. The cooling apparatus of claim 1, wherein the heat transfer means includes:
- a plurality of mount plates arranged around the inner container and spaced from each other by a predefined spacing;
- a plurality of heat transfer members respectively attached to the plurality of mount plates and configured to transfer the cold air received from the freezer to the inner container;
- a fastener for separably fastening the heat transfer members to the inner container; and
- a flexible member for thermally connecting adjacent ones of the heat transfer members to each other.

3. The cooling apparatus of claim 2, wherein each of the mount plates is formed into a plane via plane machining, wherein each of the heat transfer members includes a copper block, wherein the flexible member includes a flexible copper braid.

4. The cooling apparatus of claim 2, wherein a contact force of each heat transfer member with each mount plate is determined by adjusting a fastening force of the fastener.

5. The cooling apparatus of claim 2, wherein the fastener includes:
- a plurality of bolt members mounted on the mount plate;
- a plurality of bolt receiving holes defined in the heat transfer member; and
- a plurality of nut members respectively fastened to the bolt members respectively fitted into the bolt receiving holes to bring the heat transfer members respectively into close contact with the mount plates.

6. The cooling apparatus of claim 2, wherein the flexible member is coupled to the heat transfer member via coupling means.

7. The cooling apparatus of claim 6, wherein the coupling means includes a through-hole formed in the flexible member; and
- a coupling member inserted into the through-hole and coupled to the heat transfer member.

8. A cooling apparatus for a superconductor cooling container, the apparatus comprising:
- an inner container received inside an outer container, wherein the inner container contains a liquid coolant in which the superconductor is immersed, and includes:
  - a tubular upper body opened in a vertical direction;
  - a lower body having an open top and a blocked bottom; and a middle body formed in a tubular shape and connected to and disposed between the upper body and the lower body, a freezer disposed outside the outer container and configured to generate cold air; and a cryogenic-state maintaining device connected to the freezer and configured to maintain an inside of the inner container in a cryogenic state, and including a cooling band, wherein the cooling band is installed on an outer circumferential face of the middle body.

9. The cooling apparatus of claim 8, wherein the middle body includes a body plate having a regular polygonal shape in a plan view, wherein each of planar portions of the body plate has a thickness uniform across an entire area thereof.

10. The cooling apparatus of claim 9, wherein the body plate is manufactured by repeatedly bending a rectangular steel plate multiple times by a regular distance in a longitudinal direction thereof, and then, welding both opposite ends thereof to each other.

11. The cooling apparatus of claim 9, wherein a plurality of stud bolts are welded to the planar portion.

12. The cooling apparatus of claim 9, wherein a welded plate for securing a welding area of each of the upper body and the lower body is welded to each of a top and a bottom of the body plate.

13. The cooling apparatus of claim 12, wherein the welded plate has a flat ring shape, and is constructed such that an outer circumferential face of the welded plate has a regular polygonal shape coincident with the regular polygonal shape of an outer circumferential face of the body plate, and an inner circumferential of the welded plate has a circular shape and protrudes radially inward beyond an inner circumferential face of the body plate.

14. The cooling apparatus of claim 9, wherein a cooling band is installed around and on an outer circumferential face of the body plate.

15. The cooling apparatus of claim 14, wherein the cooling band includes a plurality of copper blocks and a flexible joint for connecting adjacent ones of the copper blocks.

16. The cooling apparatus of claim 15, wherein the copper block includes a flat rectangular plate, wherein the same number of bolt holes as the number of stud bolts installed on each of the planar portions of the body plate are defined in each copper block, wherein each stud bolt is inserted into each bolt hole such that each copper block is brought into close contact with each planar portion of the body plate, wherein each nut is fastened to each stud bolt.

* * * * *